US011214275B2

(12) United States Patent
Rafferty et al.

(10) Patent No.: US 11,214,275 B2
(45) Date of Patent: Jan. 4, 2022

(54) VEHICLES, SYSTEMS, AND METHODS FOR CHANGING A VEHICLE DRIVING MODE

(71) Applicant: Toyota Motor Engineering & Manufacturing North America, Inc., Plano, TX (US)

(72) Inventors: John Charles Rafferty, Dexter, MI (US); Lou M. Pope, Ypsilanti, MI (US); Clinton J. Williams, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 241 days.

(21) Appl. No.: 16/264,035

(22) Filed: Jan. 31, 2019

(65) Prior Publication Data

US 2020/0247427 A1 Aug. 6, 2020

(51) Int. Cl.
| | |
|---|---|
| *B60W 50/08* | (2020.01) |
| *B60K 35/00* | (2006.01) |
| *B60K 37/06* | (2006.01) |
| *G05G 1/02* | (2006.01) |
| *F16H 59/02* | (2006.01) |

(52) U.S. Cl.
CPC ........... *B60W 50/082* (2013.01); *B60K 35/00* (2013.01); *B60K 37/06* (2013.01); *F16H 59/02* (2013.01); *G05G 1/02* (2013.01)

(58) Field of Classification Search
None
See application file for complete search history.

(56) References Cited

U.S. PATENT DOCUMENTS

| | | | |
|---|---|---|---|
| 8,467,930 B2 | 6/2013 | Kimura et al. | |
| 9,657,833 B2 * | 5/2017 | Fairgrieve | B60W 30/14 |
| 10,035,510 B2 * | 7/2018 | Prakah-Asante | B60W 40/068 |
| 10,144,289 B2 | 12/2018 | Lee et al. | |
| 10,486,531 B2 * | 11/2019 | Mimura | B60K 35/00 |

(Continued)

FOREIGN PATENT DOCUMENTS

WO 2014168851 A1 10/2014

OTHER PUBLICATIONS

Infiniti USA, "2015 Infiniti Q50—Infiniti Drive Mode Selector" Oct. 23, 2014, Retrieved from https://www.youtube.com/watch?v=tHpzB7RZKAc (Year: 2014).*

*Primary Examiner* — James J Lee
*Assistant Examiner* — Tawri M Matsushige
(74) *Attorney, Agent, or Firm* — Dinsmore & Shohl LLP

(57) ABSTRACT

In one embodiment, a vehicle includes a steering wheel, one or more vehicle drive systems, one or more driving mode paddler shifters coupled to the steering wheel, an output device, and an electronic control unit. The electronic control unit is communicatively coupled to the one or more driving mode paddle shifters, the one or more vehicle drive systems, and the output device. The electronic control unit is configured to receive a drive mode shifting signal from the one or more driving mode paddle shifter indicative of a desire to change a driving mode of the vehicle, change one or more parameters of the one or more vehicle drive systems in order to change the driving mode in response to the driving mode shifting signal, and provide a notification related to the change in the driving mode with the output device.

24 Claims, 7 Drawing Sheets

(56) References Cited

U.S. PATENT DOCUMENTS

| | | | |
|---|---|---|---|
| 2005/0021190 A1* | 1/2005 | Worrell | B60K 35/00 |
| | | | 701/1 |
| 2006/0284839 A1* | 12/2006 | Breed | B62D 1/046 |
| | | | 345/156 |
| 2007/0008189 A1* | 1/2007 | Amari | G08G 1/0962 |
| | | | 340/995.19 |
| 2013/0220055 A1 | 8/2013 | Curl | |
| 2014/0350766 A1* | 11/2014 | Wang | B60W 10/08 |
| | | | 701/22 |
| 2015/0234580 A1 | 8/2015 | Secord et al. | |
| 2016/0084661 A1* | 3/2016 | Gautama | G01C 21/365 |
| | | | 701/400 |
| 2016/0185351 A1* | 6/2016 | Jerger | F16H 61/0204 |
| | | | 701/56 |
| 2016/0363213 A1* | 12/2016 | Adames | F16H 61/0213 |
| 2018/0004204 A1 | 1/2018 | Rider et al. | |
| 2018/0163852 A1 | 6/2018 | Gadola | |
| 2018/0186376 A1 | 7/2018 | Lee et al. | |
| 2018/0222492 A1 | 8/2018 | Takii et al. | |
| 2019/0128408 A1* | 5/2019 | Kishi | F16H 61/0213 |
| 2020/0062276 A1* | 2/2020 | Yuan | B60W 30/14 |

\* cited by examiner

VEHICLES, SYSTEMS, AND METHODS FOR CHANGING A VEHICLE DRIVING MODE

TECHNICAL FIELD

The present specification generally relates to vehicles, systems, and methods for changing a vehicle driving mode and, more specifically, vehicles, systems, and methods for changing a vehicle driving mode using one or more paddle shifters coupled to the steering wheel of the vehicle.

BACKGROUND

Vehicles may be provided with various driving modes (e.g., EV mode, snow mode, sport mode, etc.). However, to adjust the vehicle to operate under such driving modes a user may need to remove their hands from the steering wheel to select the desired driving mode. Moreover, it may be unclear to the user when certain drive modes may be beneficial to the operation and performance of the vehicle.

Accordingly, a need exists for alternative vehicles, systems, and methods for changing a vehicle driving mode.

SUMMARY

In one embodiment, a vehicle includes a steering wheel, one or more vehicle drive systems, one or more driving mode paddler shifters coupled to the steering wheel, an output device, and an electronic control unit. The electronic control unit is communicatively coupled to the one or more driving mode paddle shifters, the one or more vehicle drive systems, and the output device. The electronic control unit is configured to receive a drive mode shifting signal from the one or more driving mode paddle shifter indicative of a desire to change a driving mode of the vehicle, change one or more parameters of the one or more vehicle drive systems in order to change the driving mode in response to the driving mode shifting signal, and provide a notification related to the change in the driving mode with the output device.

In another embodiment, a system for changing a driving mode of a vehicle includes a steering wheel, one or more vehicle drive systems, one or more driving mode paddle shifters coupled to the steering wheel, one or more sensors configured to output a driving environment signal indicative of one or more characteristics of a driving environment of the vehicle, an output device, and an electronic control unit. The electronic control unit is communicatively coupled to the one or more driving mode paddle shifters, the one or more vehicle drive systems, the one or more sensors, and the output device. The electronic control unit is configured to receive the driving environment signal from the one or more sensors, determine a recommended driving mode based on the driving environment signal from the one or more sensors, output an indication of the recommended driving mode with the output device, receive a drive mode shifting signal from the one or more driving mode paddle shifters indicative of a desire to change a driving mode of the vehicle, and change one or more parameters of the one or more vehicle drive systems in order to change the driving mode in response to the drive mode shifting signal.

In yet another embodiment, a method of changing a drive mode of a vehicle includes receiving, with an electronic control unit, a driving environment signal from one or more sensors, determining, with the electronic control unit, a recommended driving mode based on the environment signal from the one or more sensors, and outputting, with the electronic control unit, an indication of the recommended driving mode with an output device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
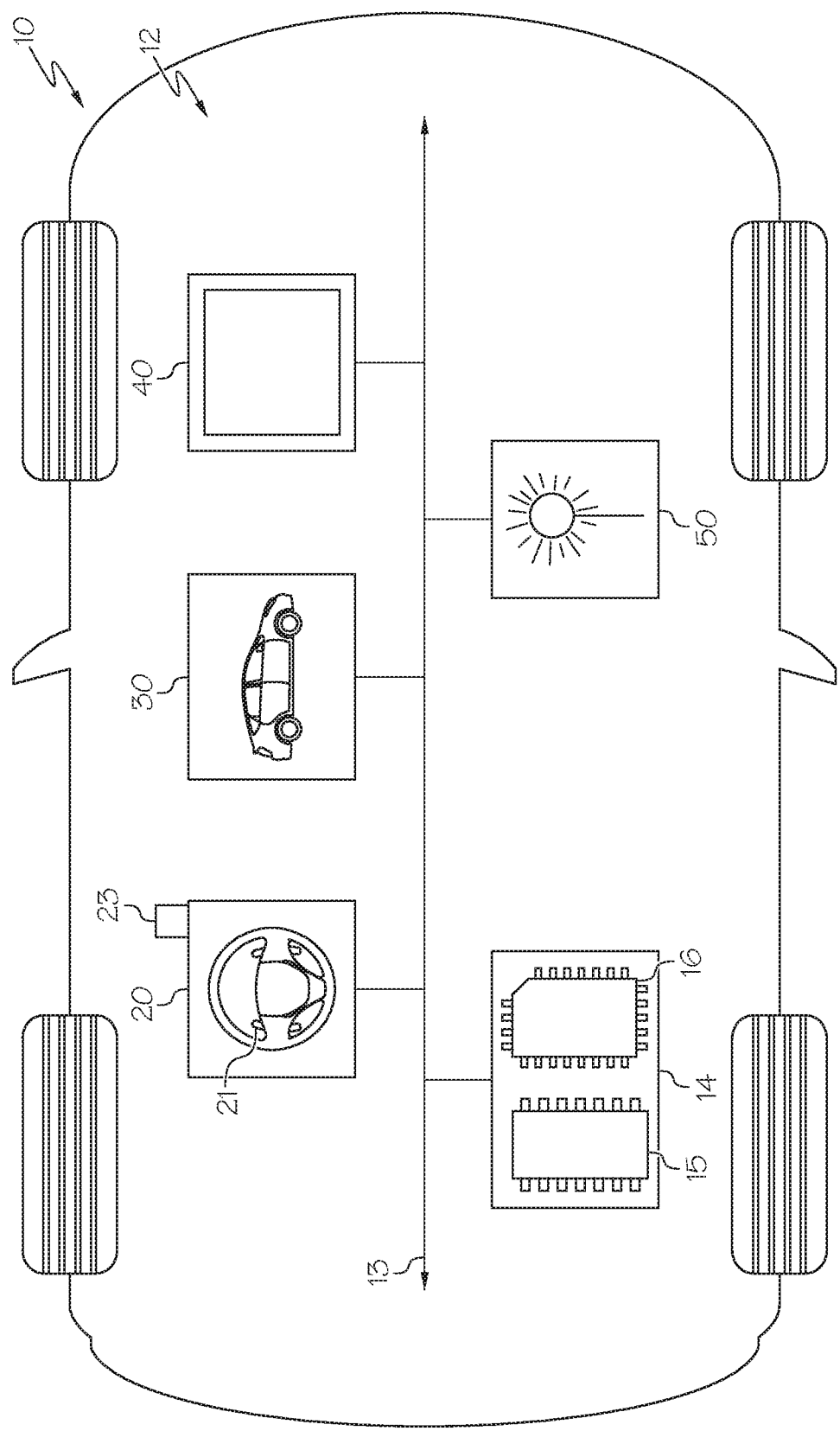
FIG. 1 schematically depicts a vehicle having a system for changing a driving mode of the vehicle, according to one or more embodiments shown and described herein.

FIG. 1 schematically depicts a system of a vehicle for changing a driving mode of the vehicle. In general, such systems include a steering wheel with one or more paddle shifters coupled thereto. By actuating (e.g., toggling, pushing, pulling, etc.) the one or more paddle shifters 21, a user can change a driving mode of the vehicle to a desired driving mode. Accordingly, a vehicle may be configured with a variety of driving modes including but not limited to a standard or normal driving mode, a sport driving mode, a snow driving mode, an eco-driving mode, an electric vehicle ("EV") driving mode, a comfort driving mode, and the like. Each driving mode may change one or more parameters of the one or more vehicle drive systems to shift the vehicle into the desired driving mode. Moreover, in some embodiments, the system may be equipped with a variety of sensors configured to output a driving environment signal indicative one or more characteristics of a driving environment of the vehicle. Based on one or more characteristics of the driving environment of the vehicle, the system may be configured to recommend a drive mode that may be useful or preferred by the driver. Various embodiments of the system will be described in greater detail herein.

As used herein, the term "driving mode" refers to a set of parameters related to of one or more vehicle drive systems that change or adjust the vehicle's comfort, economy, responsiveness, traction, or the like. For example the one or vehicle drive systems may include, but are not limited to, the vehicle steering system, the vehicle suspension system, the vehicle powertrain system, vehicle drive train system, vehicle heating/cooling systems, the vehicle traction control system, etc. Parameters which may be adjusted may include, for example, steering weight, engine performance, gear settings, throttle settings, suspension settings, fuel usage settings, and combinations thereof. Changes to these one or more parameters of the one or more vehicle drive systems may achieve better responsiveness, handling, comfort, economy, and the like. It is noted that while some driving modes may provide better fuel economy or handling in different driving environments, other drive modes may provide more greater comfort (e.g., comfort driving mode), sportier handling (e.g., sport driving mode), or even manual gear shifting (e.g., manual driving mode). The present disclosure provides an easy and more intuitive way to shift through the various driving mode options to choose a desired driving mode. It is contemplated in some embodiments that a user may define a personalized drive mode wherein various parameters of the one or more vehicle drive systems are adjusted based on driver preferences input by the user.

Referring now to FIG. 1, a vehicle 10 having a system 12 for changing a vehicle driving mode is schematically depicted. It is noted that while the vehicle 10 is depicted as an automobile, the vehicle 10 may be any passenger vehicle 10 such as, for example, a terrestrial, aquatic, and/or airborne vehicle 10.

The system 12 may generally include a communication path 13, an electronic control unit 14, a steering wheel 20 having one or more paddle shifters 21 coupled thereto, one or more vehicle drive systems 30, an output device 40, and one or more sensors 50. Each of these modules will be described in greater detail below.

As noted above, the system 12 includes a communication path 13 that provides data interconnectivity between various modules disposed within the system 12. Specifically, each of the modules can operate as a node that may send and/or receive data. In some embodiments, the communication path 13 includes a conductive material that permits the transmission of electrical data signals to processors, memories, sensors, and actuators throughout the system 12. In another embodiment, the communication path 13 can be a bus, such as for example a LIN bus, a CAN bus, a VAN bus, and the like. In further embodiments, the communication path 13 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

The electronic control unit 14 may include one or more processors 15 communicatively coupled with one or more memory modules 16. The one or more processors 15 may include any device capable of executing machine-readable instructions stored on a non-transitory computer-readable medium. Accordingly, each processor may include a controller, an integrated circuit, a microchip, a computer, and/or any other computing device.

The one or more memory modules 16 are communicatively coupled to the one or more processors 15 over the communication path 13. The one or more memory modules 16 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within system 12 and/or external to system 12. The one or more memory modules 16 may be configured to store one or more pieces of logic, as described in more detail below. The embodiments described herein may utilize a distributed computing arrangement to perform any portion of the logic described herein.

Embodiments of the present disclosure include logic that includes machine-readable instructions and/or an algorithm written in any programming language of any generation (e.g., 1GL, 2G L, 3GL, 4G L, and/or 5GL) such as, machine language that may be directly executed by the processor, assembly language, object-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. As will be described in greater detail, the logic stored on the one or more memory modules 16, when executed by the one or more processors 15 causes the system 12 to perform various functions such as changing the driving mode of the vehicle 10 based on received input and/or recommending a driving mode to the vehicle operator/user.

As noted above the system 12 includes a steering wheel 20. The steering wheel 20 may be an adjustable steering wheel 20. For example, the steering wheel 20 may have an actuator configured to increase or decrease the resistance in the steering wheel 20 making turning of the steering wheel 20 less or more difficult. For example, during a comfort driving mode, steering may become lighter or have less resistance. In a sport driving mode, steering may be tighter or heavier providing quicker responsiveness to movements of the steering wheel.

Figure 2B:
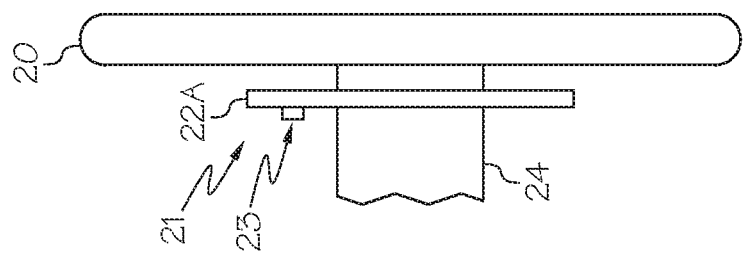
FIG. 2B depicts a side perspective view of the steering wheel of FIG. 2A, according to one or more embodiments shown and described herein.
Figure 2A:
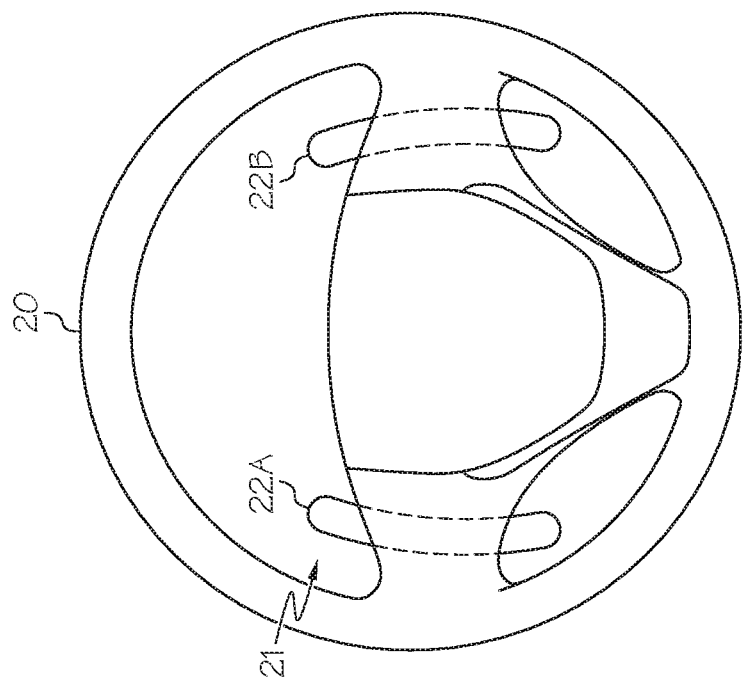
FIG. 2A depicts a perspective steering wheel, according to one or more embodiments shown and described herein.

Referring to FIGS. 2A and 2B the steering wheel 20 may be provided with one or more paddle shifters 21. The one or more paddle shifters 21 may be mounted to the stem 24 of the steering wheel 20 proximate to a back side surface of the steering wheel 20. The one or more paddle shifters 21 may be positioned so as to be accessible by the fingers of the driver while allowing the driver to maintain their grip on the steering wheel 20, thereby facilitating easy and convenient shifting of drive modes without requiring a user to remove her hands from the steering wheel while driving.

In at least one embodiment, one or more paddle shifters 21 include a first paddle shifter 22A located on a first side of the stem 24 and a second paddle shifter 22B located on a second side of the stem 24 such that the stem 24 is positioned between the first paddle shifter 22A and the second paddle shifter 22B. Each paddle shifter may be actuated independently of the other paddle shifter. The first paddle shifter 22A may be actuatable by the driver with her left hand, while the second paddle shifter 22B is actuatable by the driver with her right hand.

Figure 4A:
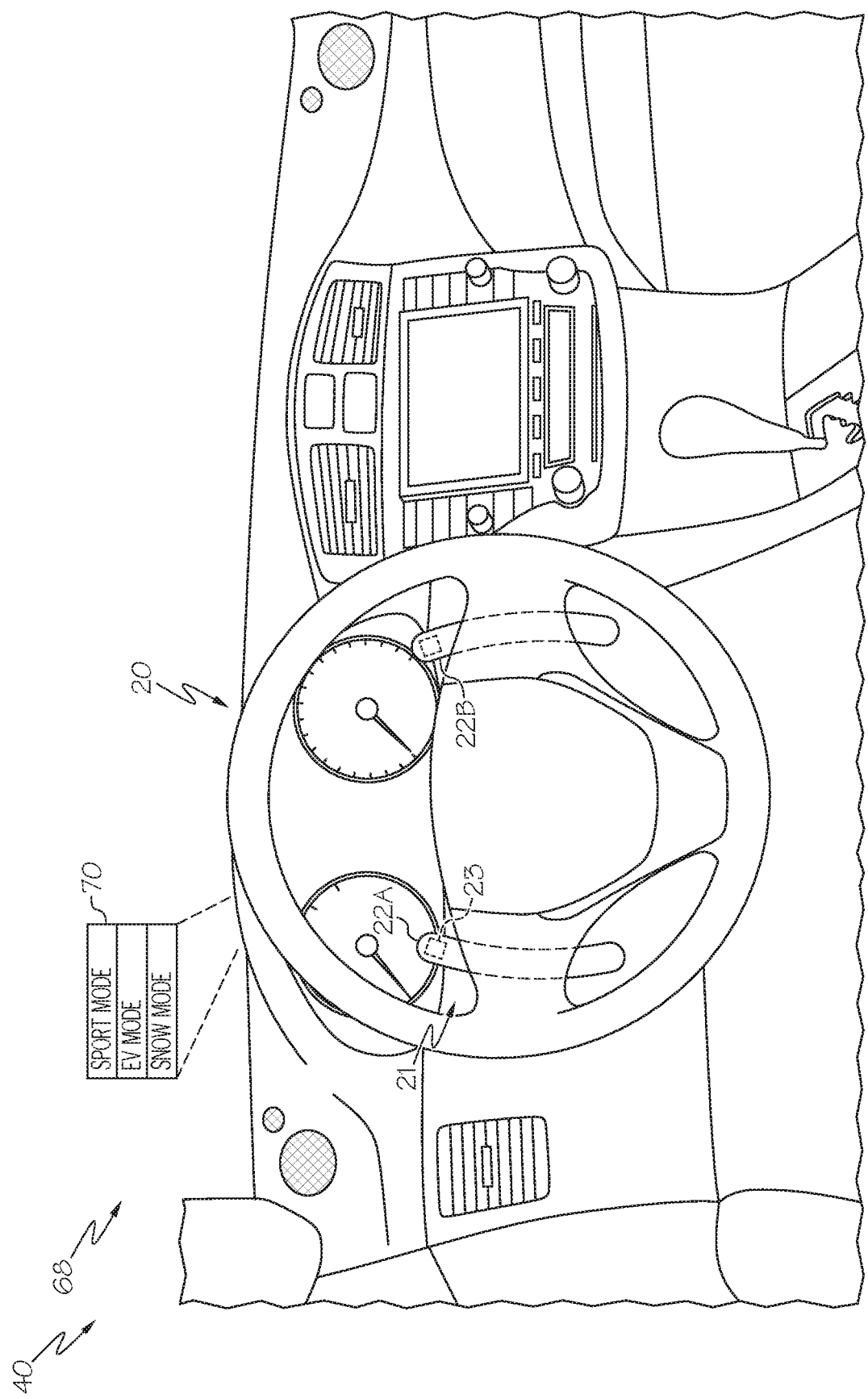
FIG. 4A depicts a heads-up-display displaying a menu of driving modes, according to one or more embodiments shown and described herein.

Referring back to FIG. 1, the one or more paddle shifters 21 are communicatively coupled to the electronic control unit 14 over the communication path 13. The one or more paddle shifters 21 may be pushable or pullable between an inactive position and an active position in which the paddle shifters 21 may be useable to choose a driving mode of the vehicle 10. As will be described in greater detail herein, the one or more paddle shifters 21 may be used to scroll or navigate a menu 70 (See FIG. 4A) of available drive modes. In some embodiments, the one or more paddle shifters 21 may be used to approve or to reject a recommended driving mode of the system 12.

In some embodiments, the system 12 may be provided with one or more additional user input devices 23 communicatively coupled to the electronic control unit 14 over the communication path 13. For example, the additional user input device(s) may be coupled to the steering wheel 20 and/or to the one or more paddle shifters 21. As shown in FIG. 2B, in at least one embodiment, the one or more additional user input devices 23 may be coupled to a surface of a paddle shifter (e.g., paddle shifter 22A) to allow for actuation by a user's hands, without causing the user to release the steering wheel 20. The one or more additional user input devices 23 may be include device capable of transforming mechanical, optical, audible, or electrical signals into a data signal capable of being transmitted with the communication path 13. For example, the one or more additional user input devices 23 may include any number of movable objects that transform physical motion into a data signal that can be transmitted over the communication path 13 such as, for example, a button, a switch, a knob, a microphone, or the like. The one or more additional user input devices 23 may allow a user additional means of communicating with the system 12. For example, in one embodiment, the one or more paddle shifters 21 may be used to navigate a menu 70 of drive modes, while a button or toggle (e.g., additional user input device 23) coupled to the one or more paddle shifters 21 or the steering wheel 20 allows the user to make a selection of a menu item arrived at after navigating the menu 70 with the one or more paddle shifters 21. In other embodiments, selections may be made directly with the one or more paddle shifters 21 by, for example, actuating a paddle shifter for a predetermined amount of time (e.g., 2 seconds), actuating the paddle shifter in a predetermined sequence (e.g., double tapping), actuating both paddle shifters 21 simultaneously, etc.

In some embodiments, the additional user input device may allow a user to switch the one or more paddle shifters 21 from a first role, e.g., driving mode selection paddles, to a second role, e.g., gear shifters for manually shifting the gears of the vehicle 10 when driving in a manual driving mode). In other embodiments, additional paddle shifters 21 may be coupled to the steering wheel 20 that are dedicated for manual gear shifting in the manual driving mode.

Referring again to FIG. 1, mode shifting may involve one or more vehicle drive systems 30. For example, various driving modes may involve adjustments to the one or more vehicle drive systems 30 including, but not limited to, the vehicle steering system, the vehicle suspension system, the vehicle powertrain system, the vehicle drive train system, vehicle heating/cooling systems, the vehicle traction control system, etc. Each of the one or more vehicle drive systems 30 may include actuators configured to change an operating parameter of the one or more vehicle drive systems 30 to transform the driving mode of the vehicle 10 to the selected driving mode.

For example, the vehicle 10 may include a plurality of driving modes. Such driving modes may include, but are not limited to a normal/standard driving mode, a comfort driving mode, a sport driving mode, a snow driving mode, an eco-driving mode, an EV driving mode, etc. The normal driving mode may be a baseline mode which balances the one or more vehicle drive systems 30 to optimize power and economy. The comfort mode may include adjustments to the vehicle suspension system to achieve a softer, more comfortable ride. The sport driving mode may include alterations to the vehicle steering system, vehicle suspension system, and, the vehicle powertrain system to alter shift points and/or stiffen up the vehicle suspension, thus providing a more dynamic and sensitive driving experience while, possibly, reducing fuel economy. The snow driving mode may include changes to the vehicles traction control, differential settings, and/or suspension settings to provide better vehicle control when driving on snowy or slick road conditions. The eco-driving mode may optimize engine and transmission performance to use less fuel and/or battery power. In the eco-driving mode, the vehicle heating/cooling systems may be adjusted to a more energy efficient temperature to converse fuel. Similarly, the EV driving mode may be a mode in which the engine, and the battery, where conditions allow, is switched off to preserve fuel economy. As, noted above, the vehicle 10 may also have a manual driving mode, where gear shifts are manually controlled by the user. In some embodiments, the vehicle 10 may further include user defined driving modes in which the user inputs, using one or more user input devices 23, preferred settings related to one or more of the one or more vehicle drive systems 30 to provide a personalized driving mode that may be saved in the one or more memory modules 16 and included in a menu of available driving modes. While these summaries generally describe parameter changes to a vehicle 10 when driving in each of these modes, additional parameter adjustments may be made without departing from the scope of the present disclosure.

Based on inputs received from the one or more paddle shifters 21 and/or the one or more additional user input devices 23, a user may choose a drive mode. The electronic control unit 14, based on the received input is configured to adjust one or more parameters of the one or more vehicle drive systems 30 to change the driving mode to a chosen driving mode.

As noted above, the system 12 includes an output device 40 communicatively coupled to the electronic control unit 14. The output device 40 may be configured to provide indications, information, and/or notifications to the user regarding a change in the driving mode of the vehicle 10 and, as will be described in greater detail herein, to provide recommended driving modes to the user. The information, indications, and/or notifications may be provided by auditory, haptic, and/or visual outputs. Accordingly, an output device 23 may include speakers, displays, and combinations thereof. In some embodiments, the output device 23 may be a heads-up-display wherein the indications, information, and/or notifications are displayed to the user on the windshield of the vehicle 10. In other embodiments, the output device 23 may include a display built into the dashboard (e.g., a meter display).

Still referring to FIG. 1, the system 12 may further include one or more sensors 50 configured to output a driving environment signal indicative of one or more characteristics of a driving environment of the vehicle 10. The driving environment of the vehicle 10 may include any number of characteristics related to the vehicle 10, the driver, and the surrounding environment of the vehicle 10. Specific characteristics of the driving environment may allow the system 12 to recommend a driving mode to the driver. For example, the driving environment signal may include, but is not limited to, image data from one or more cameras, weather data, map data, driver habit data, vehicle status data, etc.

For example, the one or more sensors 50 may include one or more cameras configured to capture image data of the landscape surrounding the vehicle 10. The electronic control unit 14 may be configured to process the image data to determine that it is snowing, sleeting, or that there is ice formation on a roadway. In such instances, the vehicle 10 may recommend to the driver to switch to the snow driving mode. As noted herein, in the snow driving mode, traction control of the vehicle may be increased to improve traction of the vehicle through potentially slippery conditions. In some embodiments, the one or more sensors 50 may include temperature sensors, where a temperature below freezing, may be indicative of potentially icy conditions.

In some embodiments, the one or more sensors 50 may further include network interface hardware configured to collect weather, and/or map data from one or more remote servers or the cloud. Based on the weather data and/or the map data, the one or more processors 15 may determine a specific type of driving mode may be appropriate (e.g., snow driving mode, a four wheel driving mode, or any increased traction control mode.) In some cases, based on map data the electronic control unit 14 may determine that the vehicle is on a freeway, highway, country road, and may recommend the sport driving mode for increased density and dynamic shifting. In some cases, wherein the vehicle 10 is determined to be one a freeway, the electronic control unit 10 by suggest an EV driving mode to conserve fuel.

In some cases the one or more sensors 50, may include sensors configured to collect information from surrounding vehicles using vehicle-to-vehicle (V2V) communication. Based on the information collected from the surrounding vehicles, the electronic control unit 14 may recommend an appropriate driving mode. For example, where the vehicle 10 is sitting in traffic, the one or more sensors 50 may output a signal indicative of the vehicle 10 sitting in traffic. Based on this signal, the vehicle 10 may recommend changing to eco or EV driving modes to conserve fuel.

In some embodiments, the one or more sensors 50 may include user recognition sensors (e.g., user facing camera sensors, key fob sensors, fingerprint sensors, etc.). Based on the signal from the user recognition sensors 50, the electronic control unit 14 may recognize the driver and retrieve recorded driver habit data stored on the one or more memory modules 16. Based on the driver habit data, the electronic control unit 14 may determine a preferred driving mode (e.g., based on number of times of use, or last used driving mode) and recommend the preferred driving mode to the user.

In some embodiments, the one or more sensors 50 may include vehicle status sensors. Such vehicle status sensors may output a signal indicative of the present status (e.g., health) data of the vehicle 10. For example, where the vehicle 10 is low on fuel, the electronic control unit 14 may recommend the EV or Eco driving mode to the user in order to conserve fuel.

While various example embodiments of the one or more sensors 50 have been provided, it is contemplated that other sensors 50 that provide information indicative of the driving environment of the vehicle 10 may be used without departing from the scope of the present disclosure.

Figure 3:
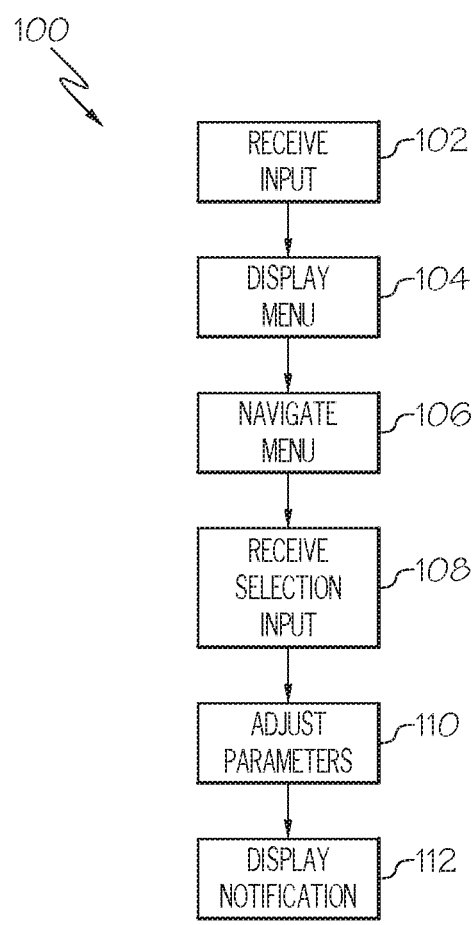
FIG. 3 illustrates a flowchart depicting a method of changing a driving mode of a vehicle, according to one or more embodiments shown and described herein.

Referring now to FIG. 3, a flow chart 100 illustrating a method of changing a driving mode of the vehicle 10 is depicted. While the flow chart 100 shows a number of steps in a particular order, the method may include a greater or fewer number of steps in any order without departing from the scope of the present disclose. At step 102, the electronic control unit 14 receives a drive mode shifting signal from the one or more driving mode paddle shifters 21 indicative of a desire to change a driving mode of the vehicle 10. In some embodiments, an unprompted drive mode shifting signal (i.e., not in response to a recommended driving mode) from the one or more driving mode paddle shifters 21 may prompt the electronic control unit 14 to display a menu of driving mode options available for the user to choose.

For example, and as illustrated in FIG. 4, a menu 70 is illustrated on an output device 40 that includes a heads-up-display 68. The menu 70 may appear upon actuation of one of the one or more paddle shifters 21. In other embodiments, the menu 70 may be continuously present. While the menu 70 is illustrated as a vertical column listing different driving modes (e.g., sport, EV, and snow driving modes), the menu 70 may take any form. Referring again to FIG. 3 at step 106, further actuation of the one of the one or more paddle shifters 21 may cause the electronic control unit 14 to navigate the menu 70 to a desired drive mode option. In embodiments with a first paddle shifter 22A and a second paddle shifter 22B, further actuation of the first paddle shifter 22A may cause the electronic control unit 14 to navigate the menu 70 in a first direction (e.g., scroll up) while further actuation of the second paddle shifter 22B may cause the electronic control unit 14 to navigate the menu 70 in a second direction (e.g., scroll down). As noted herein, the user may be able to select the desired driving mode using the one or more paddle shifters 21 or an additional user input device 30.

As noted herein, in some embodiments, the electronic control unit 14 may be configured to output a recommended driving mode through an output device 40. Accordingly, in some embodiments, the menu 70 may only be displayed when there is an unprompted actuation of a paddle shifter (i.e., not in response to a recommended driving mode). In some embodiments, when recommending a driving mode, the electronic control unit 14 may automatically display the menu 70 with the recommended driving mode highlighted.

Figure 4B:
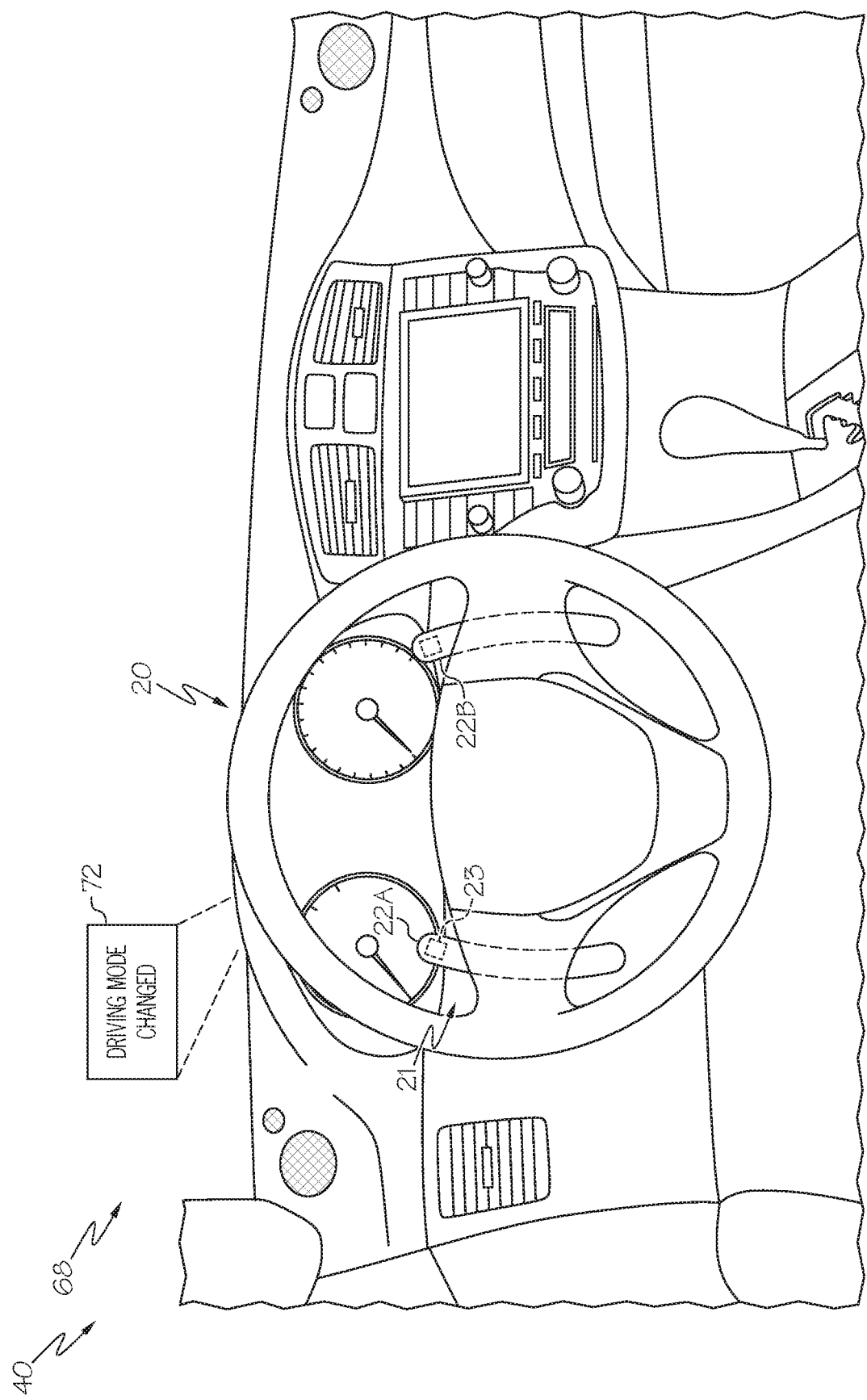
FIG. 4B depicts the heads-up-display displaying a notification that the driving mode was changed, according to one or more embodiments shown and described herein.

At step 108, the electronic control unit 14 can receive a selection input from the one or more paddle shifters 21 or the one or more additional input devices 30 as described herein. Once the selection has been received, at step 110 the electronic control unit 14 adjusts one or more parameters of the one or more vehicle drive systems 30 in order to change the driving mode in response to the received drive mode shifting signal which may include a selection signal. At step 112, the electronic control unit 14 is configured to provide a notification related to the change in the driving mode with the output device 40. For example, and as illustrated in FIG. 4B, the electronic control unit 14 may cause a heads-up-display 60 to display a completion notification 72 indicating the driving mode has been changed. In some embodiments, the notification may include an indication of the specific driving mode that has been changed to (e.g., snow mode, EV mode, comfort mode, etc.). In other embodiments, the completion notification 72 may be provided audibly or through haptic feedback, e.g., vibrations received through the steering wheel 20.

Figure 5:
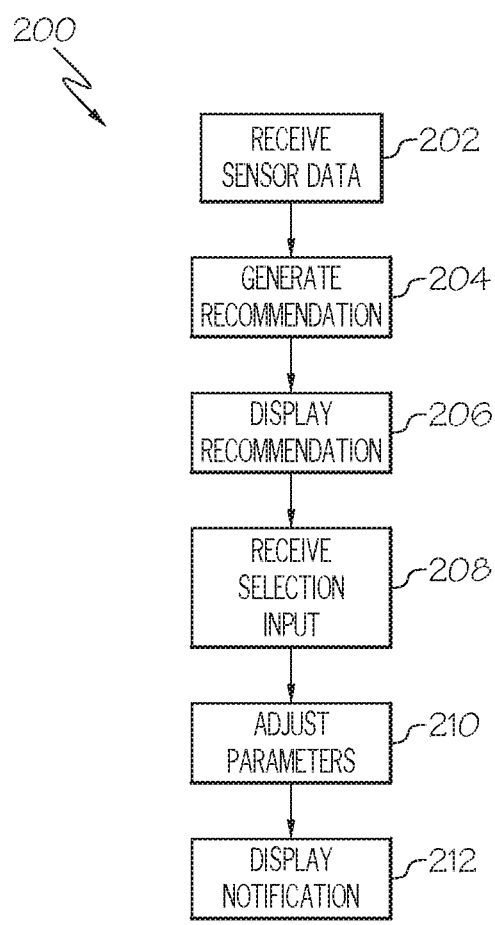
FIG. 5 illustrates a flowchart depicting a method of changing a driving mode of a vehicle, according to one or more embodiments shown and described herein.
Figure 6:
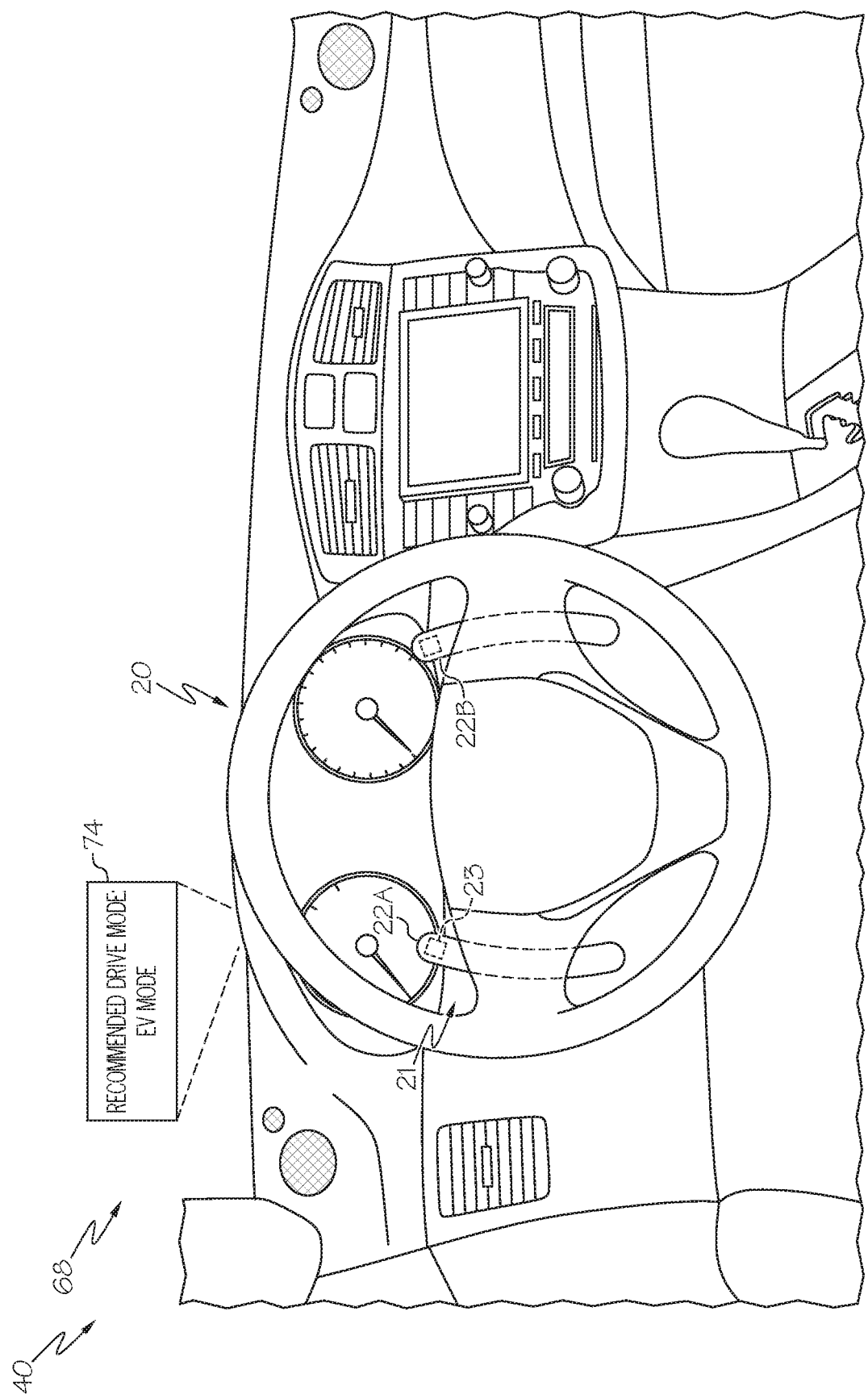
FIG. 6 illustrates a heads-up-display displaying a recommended driving mode, according to one or more embodiments shown and described herein.

Referring now to FIG. 5, a second flowchart 200 illustrating another method of changing a driving mode of the vehicle 10 is depicted. This method is directed to embodiments wherein the electronic control unit 14 generates a recommendation to the driver of a recommended driving mode. As described above in relation to FIG. 1, the system 12 may include one or more sensors 50. The one or more sensors 50 may output a driving environment signal indicative of one or more characteristics of the driving environment of the vehicle 10. The driving environment signal may include at least one of image data from one or more cameras, weather data, map data, driver habit data, and/or vehicle 10 status/heath data. At step 202 the electronic control unit 14 receives the driving environment signal from the one or more sensors 50. At step 204 the electronic control unit 14 processes the driving environment signal to determine a recommended driving mode based on the driving environment signal from the one or more sensors 50. For example, and as illustrated in FIG. 6, based on the received driving environment signal, the electronic control unit 14 may determine that the vehicle 10 is low on fuel and recommend the EV driving mode. At step 206, the electronic control unit 14 outputs an indication 72 of the recommended driving mode with the output device 40. Continuing with the above example, the output device 40 may be a heads-up-display and the electronic control unit 14 may cause the heads-up-display to display an indication 74 indicating the recommended driving mode, in this case the EV driving mode.

Referring again to FIG. 5, at step 208 the electronic control unit 14 may receive a response signal with the one or more paddle shifters 21. Wherein the response signal is indicative of approval of the recommended driving mode, at step 210 the electronic control unit 14 changes one or more parameters of the one or more vehicle drive systems 30 in order the change the driving mode to the recommended driving mode. For example, when switching to EV driving mode, the engine may be turned off and the vehicle 10 may be run with available battery power. At step 212, upon changing of the driving mode to the recommended driving mode, the electronic control unit 14 may display a completion notification indicating that the driving mode has been changed, similar to that illustrated in FIG. 4B.

In some embodiments, the step of determining a recommended driving mode may include determining a recommendation confidence level. The recommendation confidence level may be a measure of how beneficial a change to a driving mode may be to vehicle operations. For example, when the fuel tank is full, there may be a lower recommendation confidence level that recommending a change to eco or EV driving modes would be beneficial. However, when the fuel tank is less than half full, less than a quarter full, less than an eighth full, etc., the recommendation confidence level that eco or EV driving mode would be a higher recommendation confidence level that is higher than the lower recommendation confidence level. As another example, when the one or more sensors 50 output the driving environment signal and the driving environment signal indicates that there is a chance of snow, but there is no snow on the roads, based on received image data, the recommendation confidence level that the snow driving mode is beneficial may be a lower recommendation confidence level. However, when the driving environment signal indicates there is accumulated snow on or near the roads, the electronic controller may determine that the snow driving mode is beneficial and may determine that the recommendation confidence level is a higher recommendation confidence level that is higher than the lower recommendation confidence level. Confidence levels may be measured in terms of percentages. For example, each driving mode may include a number of measurable or detectable characteristics that determine whether the particular driving mode is appropriate. If a certain driving environment have 50% or more, 60% or more, 80% or more of the those characteristics, the electronic control unit 14 may determine that it would be beneficial to recommend a particular driving mode to which those characteristics relate. In embodiments that utilize a recommendation confidence level, the electronic control unit 14 may be configured to display a recommended driving mode only when the confidence level is above a predetermined level and not display the recommended driving mode when the confidence level is not above the predetermined level.

It should now be understood that embodiments as described herein are directed to vehicles, systems, and methods for changing a driving mode of a vehicle. In general, such vehicles and systems include a steering wheel with one or more paddle shifters coupled thereto. By actuating (e.g., toggling) the one or more paddle shifters a user can change a driving mode of the vehicle to a desired driving mode. Accordingly, a vehicle may include a variety of driving modes including but not limited to standard, sport, snow, eco, electric vehicle, comfort, and the like. Each mode may change one or more vehicle settings to shift the vehicle into the desired driving mode. Moreover, in some embodiments, the system may be equipped with a variety of sensors configured to output a signal indicative of a driving environment of the vehicle. Based on characteristics of the driving environment of the vehicle, the system may be configured to recommend a drive mode that may be useful or preferred by the driver. Various embodiments of the system will be described in greater detail herein.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
  a steering wheel;
  one or more vehicle drive systems comprising at least a vehicle suspension system;
  one or more driving mode paddle shifters coupled to the steering wheel;
  an output device; and
  an electronic control unit communicatively coupled to the one or more driving mode paddle shifters, the one or more vehicle drive systems, and the output device, wherein the electronic control unit is configured to:
    output a menu of a plurality of driving modes of the vehicle with the output device based on an operation of the one or more driving mode paddle shifters, each of the plurality of driving modes referring to a set of parameters that adjust at least one of the vehicle's economy, responsiveness, or traction;
    navigate the menu of the plurality of driving modes of the vehicle using the one or more driving mode paddle shifters;
    receive a drive mode shifting signal from the one or more driving mode paddle shifters indicative of a selection of one of the plurality of driving modes in the menu with the one or more driving mode paddle shifters,
change one or more parameters of the one or more vehicle drive systems in order to change the driving mode in response to the drive mode shifting signal, wherein the vehicle suspension system is adjustable based on the driving mode of the vehicle, and
provide a notification related to the change in the driving mode with the output device.

2. The vehicle of claim 1, wherein the output device comprises a heads-up-display.

3. The vehicle of claim 1, wherein the output device comprises a display.

4. The vehicle of claim 1, wherein the one or more driving mode paddle shifters include a first paddle shifter and a second paddle shifter.

5. The vehicle of claim 4, wherein:
the output device comprises a display, and
actuating one of the first paddle shifter and the second paddle shifter causes the electronic control unit to display the menu of driving mode options with the display.

6. The vehicle of claim 4, wherein:
the output device comprises a display,
actuating one of the first paddle shifter and the second paddle shifter causes the electronic control unit to display the menu of driving mode options with the display; and
shifting of the first paddle shifter causes the electronic control unit to navigate the menu in a first direction, and
shifting of the second paddle shifter causes the electronic control unit to navigate the menu in a second direction.

7. The vehicle of claim 1, wherein:
the output device comprises a display, and
actuating one of the one or more driving mode paddle shifters causes the electronic control unit to display the menu of driving mode options with the display.

8. The vehicle of claim 7, wherein shifting of the one or more driving mode paddle shifters causes the electronic control unit to navigate the menu.

9. The vehicle of claim 1, wherein the one or more driving modes comprises at least one driving mode comprising two or more parameters which are adjusted in response to the drive mode shifting signal.

10. The vehicle of claim 1, wherein the electronic control unit is configured to change the one or more driving mode paddle shifters from a first role to a second role,
in the first role, the electronic control unit changes one or more parameters of the one or more vehicle drive systems in response to the drive mode shifting signal, and
in the second role, the electronic control unit shifts gears of the vehicle in response to the drive mode shifting signal.

11. The vehicle of claim 1, wherein the one or more driving mode paddle shifters comprise a first paddle shifter and a second paddle shifter, and selection of the driving mode with the first paddle shifter and the second paddle shifter comprises actuating the first paddle shifter and the second paddler shifter simultaneously.

12. The vehicle of claim 1, wherein the one or more driving mode paddle shifters comprise a first paddle shifter and a second paddle shifter, and selection of the driving mode with the first paddle shifter and the second paddle shifter comprises actuating the first paddle shifter and the second paddle shifter in a predetermined sequence.

13. A system for changing a driving mode of a vehicle, the system comprising:
a steering wheel;
one or more vehicle drive systems comprising at least a vehicle suspension system;
one or more driving mode paddle shifters coupled to the steering wheel;
one or more sensors configured to output a driving environment signal indicative of one or more characteristics of a driving environment of the vehicle;
an output device, and
an electronic control unit communicatively coupled to the one or more driving mode paddle shifters, the one or more vehicle drive systems, the one or more sensors, and the output device, wherein the electronic control unit is configured to:
receive the driving environment signal from the one or more sensors;
determine a recommended driving mode based on the driving environment signal from the one or more sensors;
output a menu of a plurality of driving modes including the recommended driving mode with the output device based on an operation of the one or more driving mode paddle shifters, each of the plurality of driving modes referring to a set of parameters that adjust at least one of the vehicle's economy, responsiveness, or traction;
navigate the menu of the plurality of driving modes of the vehicle using the one or more driving mode paddle shifters;
receive a drive mode shifting signal from the one or more driving mode paddle shifters indicative of a selection of one of the plurality of driving modes in the menu with the one or more driving mode paddle shifters; and
change one or more parameters of the one or more vehicle drive systems in order to change the driving mode in response to the drive mode shifting signal, wherein the vehicle suspension system is adjustable based on the driving mode of the vehicle.

14. The system of claim 13, wherein the electronic control unit is configured to:
receive a response signal from the one or more driving mode paddle shifters in response to outputting the indication of the recommended driving mode; and
change one or more parameters of the one or more vehicle drive systems in order to change the driving mode to the recommended driving mode in response to receiving the response signal from the one or more driving mode paddle shifters indicative of approval of the recommended driving mode.

15. The system of claim 13, wherein the driving environment signal includes at least one of image data from one or more cameras, weather data, map data, driver habit data, and vehicle status data.

16. The system of claim 13, wherein the electronic control unit is further configured to:
receive an unprompted drive mode shifting signal from the one or more driving mode paddle shifters indicative of a desire to change the driving mode of the vehicle;
change one or more parameters of the one or more vehicle drive systems in order to change the driving mode in response to the unprompted drive mode shifting signal, and provide a notification related to the change in the driving mode with the output device.

17. The system of claim 16, wherein:
the output device comprises a display, and
the unprompted drive mode shifting signal causes the electronic control unit to display the menu of driving mode options with the display.

18. The system of claim 16, wherein the one or more driving mode paddle shifters include a first paddle shifter and a second paddle shifter.

19. The system of claim 18, wherein:
the output device comprises a display,
the unprompted drive mode shifting signal causes the electronic control unit to display the menu of driving mode options with the display,
actuating of the first paddle shifter causes the electronic control unit to navigate the menu in a first direction, and
actuating of the second paddle shifter causes the electronic control unit to navigate the menu in a second direction.

20. A method of changing a driving mode of a vehicle, the method comprising:
receiving, with an electronic control unit, a driving environment signal from one or more sensors indicative of one or more characteristics of a driving environment of the vehicle;
determining, with the electronic control unit, a recommended driving mode based on the driving environment signal from the one or more sensors;
outputting, with the electronic control unit, a menu of a plurality of driving modes including the recommended driving mode with an output device based on an operation of one or more driving mode paddle shifters coupled to a vehicle steering wheel, each of the plurality of driving modes referring to a set of parameters that adjust at least one of the vehicle's economy, responsiveness, or traction;
navigating the menu of the plurality of driving modes of the vehicle using the one or more driving mode paddle shifters;
receiving, with the electronic control unit, a response signal from the one or more driving mode paddle shifters coupled to a vehicle steering wheel indicative of a selection of one of the plurality of driving modes in the menu with the one or more paddle shifters; and
changing one or more parameters of one or more vehicle drive systems in order to change the driving mode to the recommended driving mode in response to receiving the response signal from the one or more driving mode paddle shifters indicative of approval of the recommended driving mode, wherein the one or more vehicle drive systems includes a vehicle suspension system and the vehicle suspension system is adjustable based on the driving mode of the vehicle.

21. The method of claim 20, further comprising changing two or more parameters of one or more vehicle drive systems in order to change the driving mode to the recommended driving mode in response to receiving the response signal from the one or more driving mode paddle shifters indicative of approval of the recommended driving mode.

22. The method of claim 20, further comprising determining a confidence level, wherein the recommended driving mode is only displayed when the confidence level is above a predetermined level.

23. The method of claim 20, wherein the driving environment signal includes at least one of image data from one or more cameras, weather data, map data, driver habit data, and vehicle status data.

24. The method of claim 20, wherein the output device is a heads-up-display.

* * * * *